United States Patent [19]

Norton et al.

[11] Patent Number: 4,667,971
[45] Date of Patent: May 26, 1987

[54] FAST CHANGE TOP JAW SYSTEM

[75] Inventors: Jerry Norton, Schoolcraft; Duane Burnham, Vicksburg, both of Mich.

[73] Assignee: Buck Chuck Company, Kalamazoo, Mich.

[21] Appl. No.: 741,771

[22] Filed: Jun. 6, 1985

[51] Int. Cl.⁴ .............................................. B23B 5/34
[52] U.S. Cl. ..................... 279/121; 279/123
[58] Field of Search ........ 279/121, 123, 111, 112–120, 279/110, 15 J; 269/254 R, 254 CS

[56] References Cited

U.S. PATENT DOCUMENTS

| | | | |
|---|---|---|---|
| 2,667,358 | 1/1952 | Highberg | 279/123 |
| 2,965,384 | 12/1960 | Lowe | 279/123 |
| 3,172,674 | 3/1965 | Lowe | 279/123 |
| 3,219,356 | 1/1964 | Wilterdink | 279/123 |
| 3,424,467 | 1/1969 | Buck | 279/121 |
| 3,679,221 | 7/1972 | Behrens | 279/123 |
| 3,833,232 | 9/1974 | Behrens | 279/123 |
| 3,868,120 | 2/1975 | Blaettry | 279/123 |
| 4,029,325 | 6/1977 | Roehm | 279/123 |
| 4,270,763 | 6/1981 | Roehm | 279/123 |
| 4,352,500 | 10/1982 | Blaettry | 279/121 |
| 4,569,530 | 2/1986 | Cross | 279/121 |

FOREIGN PATENT DOCUMENTS 2105102 10/1971 Fed. Rep. of Germany ...... 279/123

Primary Examiner—Z. R. Bilinsky
Assistant Examiner—A. Dougas
Attorney, Agent, or Firm—Flynn, Thiel, Boutell & Tanis

[57] ABSTRACT

A quick changing jaw carrier assembly for mounting a top jaw. The jaw carrier assembly includes a main jaw carrier slidably confined for radial movement within a slot of a rotatable housing. An auxiliary jaw carrier or locking wedge is radially slidably mounted on the main jaw carrier. The auxiliary and main jaw carriers define radially opposed wedges for defining a dovetail structure which lockingly engages a similar such structure on the top jaw. The auxiliary jaw carrier is spring urged outwardly into a jaw-engaging position, and can be manually moved inwardly from this position when release of the jaw is desired. A manually-controlled locking cam is rotatably supported on the main jaw carrier and can be rotatably displaced into a locking position wherein the locking cam projects radially beneath a shoulder formed on the auxiliary jaw carrier when the latter is in its jaw-engaging position.

16 Claims, 4 Drawing Figures

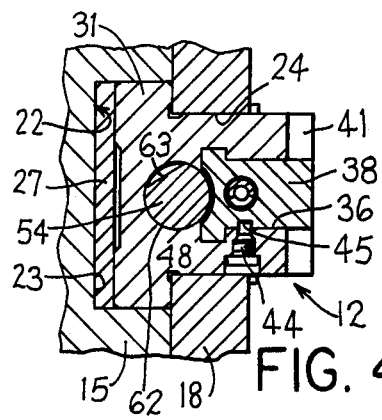
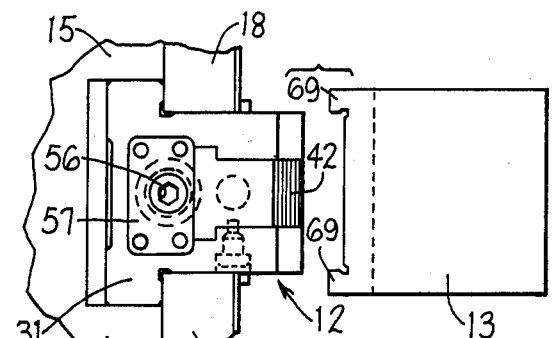
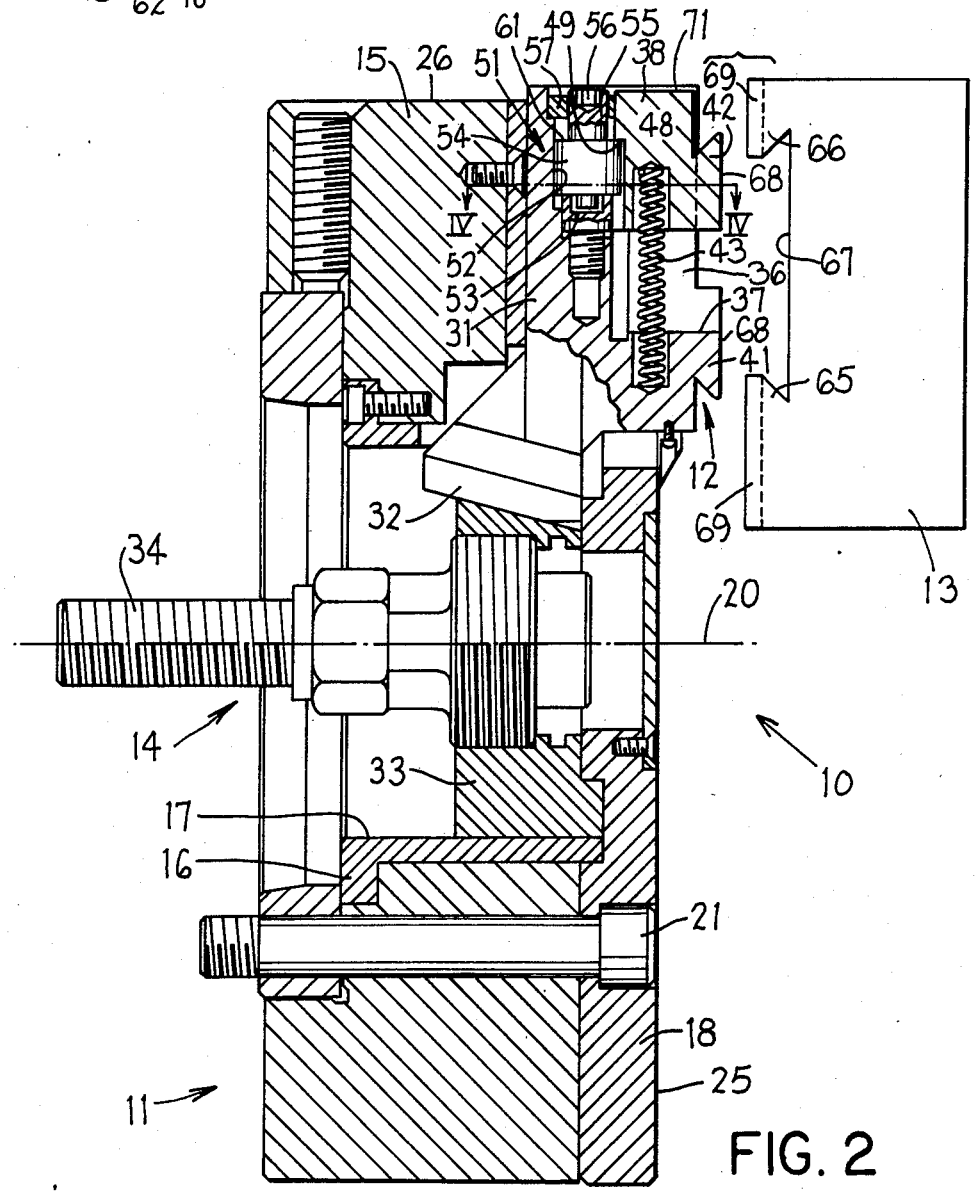

FAST CHANGE TOP JAW SYSTEM

FIELD OF THE INVENTION

This invention relates to a jaw-type chuck and, more specifically, to an improved mounting arrangement for facilitating the fast changing of the top jaws.

BACKGROUND OF THE INVENTION

Conventional jaw chucks as associated with rotary machine tools, such as lathes, employ a rotatable chuck housing which mounts thereon a plurality of radially displaceable jaw carriers, and these in turn removably mount jaws which are adapted for gripping a workpiece. The jaws assume many shapes and sizes, and hence are interchangeably mountable on the jaw carriers to facilitate use of the chuck in conjunction with a wide variety of workpieces. One conventional mounting technique for removably securing the jaws to the jaw carriers involves the use of threaded fasteners, specifically screws or bolts. Such arrangements, however, are time consuming when changing of the jaws is desired, increase the size, mass and complexity of the jaw arrangement, and often result in structures which reduce the rigidity of the jaw assembly but increase the undesired centrifugal force effect.

In an attempt to facilitate the mounting of the jaws on the carrier assemblies, several arrangements have been developed employing a carrier assembly having main and auxiliary carrier members which are relatively movable with respect to one another to facilitate the mounting or removal of the jaw. Most of these arrangements, however, have still possessed features which have resulted in structural and operational complexities.

One such arrangement is illustrated by U.S. Pat. No. 3,868,120 (Blaettry). This patent illustrates a main jaw carrier having an auxiliary carrier slidably mounted thereon. In this arrangement, however, all of the opposed surfaces of the jaw carriers must be rigidly joined together to permit proper utilization of the arrangement, and hence this restricts the changing of the jaws.

Another arrangement is illustrated by U.S. Pat. No. 3,219,356 (Wilterdink) which discloses a rotary cam for locking the upper and lower jaw carrier portions together, although the joining of the carrier portions is through interfitting serrated surfaces. This type of arrangement increases the manufacturing cost and decreases the efficiency of the apparatus as regards its convenience of use.

Other arrangements of this general type are disclosed by U.S. Pat. Nos. 3,833,232, 2,667,358, 3,679,221 and 4,352,500. The arrangements of these latter patents involve complex structural and functional arrangements which hence minimize their desirability.

Accordingly, this invention relates to an improved jaw carrier arrangement for permitting rapid and efficient removing and/or mounting of a top jaw. The improved jaw carrier arrangement is believed to possess a highly improved and more desirable structural and functional arrangement so as to facilitate both economical manufacture and efficient utilization thereof.

In the improved jaw carrier arrangement of this invention, there is provided a main jaw carrier which slidably supports thereon an auxiliary or locking carrier. The main and auxiliary carriers are radially spring-urged apart, with the auxiliary carrier being radially outermost and slidably supported on the main carrier. A locking cam is rotatably mounted on the main carrier for locking the auxiliary carrier in an outer position in which position the carriers are adapted to rigidly support a jaw thereon. The auxiliary and main carriers have oppositely directed dovetail grooves to facilitate rapid but secure engagement with opposed grooves formed on the jaw. The locking cam can be rotated into a release position wherein the auxiliary carrier can be easily manually displaced inwardly in opposition to the spring to facilitate mounting or removing of the jaw. Release of the manual pressure on the auxiliary carrier results in the spring urging the auxiliary carrier outwardly to securely grip the jaw by the opposed dovetail guides, and thereafter the locking cam is rotated to engage the auxiliary jaw carrier and prevent inward movement thereof.

The improved jaw carrier arrangement, as aforesaid, permits a jaw to be rapidly mounted on or removed from the assembly, and the rotational centrifugal force imposed on the auxiliary carrier acts through the dovetail guide to create a more secure gripping of the jaw. This arrangement also permits the jaw, and its point of engagement with the workpiece, to be positioned more closely adjacent the front of the chuck housing and hence closer to the main spindle bearings so as to provide improved overall rigidity. The arrangement also possesses a limiting stop which cooperates between the auxiliary and main carriers for maintaining the auxiliary carrier in an outermost limit position, due to the urging of the spring, when the jaw is removed from the carrier assembly.

Other objects and purposes of the invention will be apparent to persons familiar with structures of this type upon reading the following specification and inspecting the accompanying drawings.

BRIEF DESCRIPTION OF THE DRAWINGS

FIG. 2 is a central sectional view through the chuck as appearing in FIG. 1.

FIG. 3 is a fragmentary top view which illustrates the upper end of the jaw carrier assembly as appearing in FIG. 2.

FIG. 4 is a sectional view as taken substantially along line IV—IV in FIG. 2.

Figure 1:
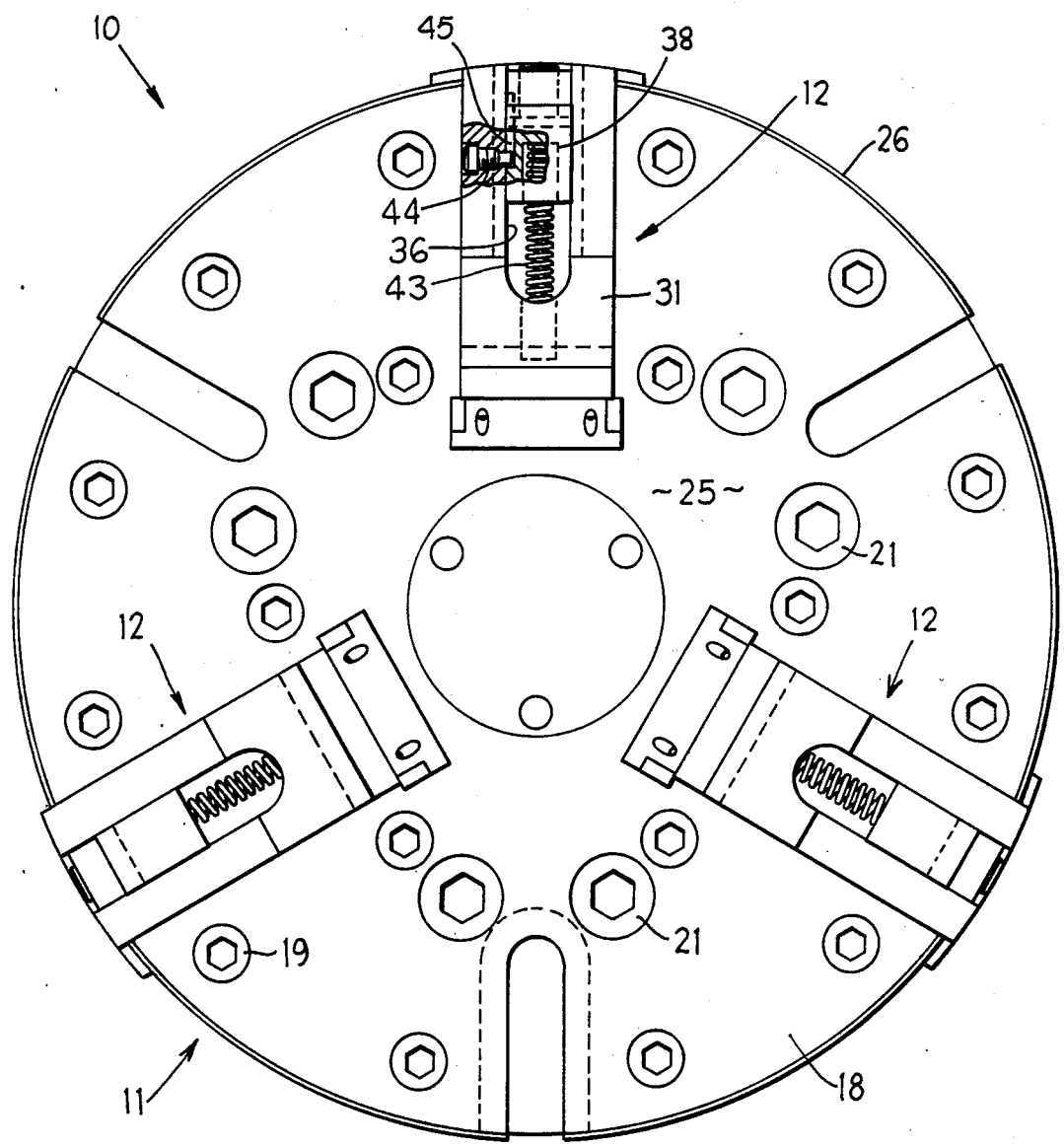
FIG. 1 is an elevational view illustrating the end or front face of the chuck, the top jaws being removed for purposes of illustration.

Certain terminology will be used in the following description for convenience in reference only, and will not be limiting, for example, the words "rightwardly", "leftwardly", "upwardly", and "downwardly" will refer to directions in the drawings to which reference is made. The word "front" will refer to the exposed face of the chuck, namely the rightward side thereof as appearing in FIG. 2. The words "inwardly" and "outwardly" will refer to directions toward and away from, respectively, the geometric center of the chuck and designated parts thereof. Said terminology will include the words specifically mentioned, derivatives thereof, and words of similar import.

DETAILED DESCRIPTION

Referring to the drawings, there is illustrated a chuck assembly 10 which includes a housing 11 having thereon a plurality, here three, of jaw carrier assemblies 12 disposed in uniformly angularly spaced relationship around the housing. Each carrier assembly 12 is adapted to have a jaw 13, normally referred to as a top jaw, removably mounted thereon. A conventional actuator or draw bar assembly 14 connects to the carrier assemblies 12 for controlling the radial movement thereof, and hence the positioning of the jaws 13 for engagement with a workpiece. The chuck assembly 10 having an overall configuration as described above is conventional and is adapted to be mounted on and rotatably supported adjacent the front face of a machine tool, such as a lathe, for supporting a workpiece which is to be machined.

The housing 11 includes a main annular housing part 15 which, in the illustrative embodiment, has an inner liner or sleeve 16 concentrically mounted therein, the latter defining a central bore 17 which projects through the housing part. An annular front plate 18 is fixed to the housing part 15, as by fasteners 19. The radially inner portion of this plate 18 radially overlaps the front end of the bore 17 and effectively defines a front stop for the drawbar assembly 14. A plurality of elongated fasteners 21 extend completely through the housing for permitting its attachment to a rotatable front plate associated with the spindle of the lathe.

The housing assembly 11 has a plurality of T-shaped slots 22 formed therein. These slots 22 project radially outwardly from the bore 17 through the outer periphery of the housing, and also open axially outwardly through the front face 25. These T-shaped slots 22, there being three such slots which mount therein carrier assemblies 12, project radially outwardly of the housing in uniformly angularly spaced relationship therearound. Each slot 22, when viewed in cross section has an enlarged head portion 23 which is spaced axially rearwardly from the front plate 18. The head portion 23 is joined to a narrower stem portion 24 which projects axially through the front plate 18. The T-shaped slot 22 projects radially through the outer peripheral wall 26 of the housing, and is conventionally provided with a bushing or slide plate 27 fixed to the rear wall thereof to facilitate the free radial sliding movement of the respective carrier assembly.

The carrier assembly 12 includes a main jaw carrier 31 (often referred to as a master jaw) which is also T-shaped in cross-section and sized so as to be snugly but radially slidably disposed within a respective one of the T-shaped slots 22. The main jaw carrier 31 has the leg or stem portion thereof projecting outwardly of the slot past the front face of the front plate 18 for releasable engagement with the top jaw 13, as explained hereinafter.

A wedge or cam portion 32 is fixedly, here integrally, formed on the radially inner end of the main jaw carrier 31, which wedge portion 32 projects into the bore 17 and is slidably engaged within a wedge-shaped groove formed on the piston 33 associated with the draw bar assembly 14. This piston 33 is axially slidably supported within the bore 17 and has a bar 34 fixed thereto and projecting rearwardly therefrom, the latter being connected to the standard axially movable drawbar as associated with a lathe. The connection of the main jaw carriers to the drawbar assembly by means of wedgelike cams, whereby the jaw carriers are moved radially in response to axial movement of the drawbar assembly, is conventional and well known, and one typical construction of such arrangement is illustrated by U.S. Pat. No. 3,424,467.

Jaw carrier 31 has a groove 36 formed therein, which groove projects radially inwardly from the outer end of the carrier through a predetermined extent and terminates at an inner end wall 37. This groove 36 is also T-shaped in cross-section so that the narrower or stem portion of the T-shaped groove opens axially outwardly through the front face of the jaw carrier 31. This T-shaped groove 36 hence extends parallel to the T-shaped slot 22.

The jaw carrier assembly 12 also includes an auxiliary jaw carrier 38, hereinafter referred to as a locking member or wedge, the latter being of T-shaped cross-section and slidably supported within the groove 36 of the main carrier 31. This T-shaped locking wedge 38 has the leg or stem portion thereof projecting axially forwardly of the groove 36 so that both the main carrier 31 and the locking wedge 38 have the front faces thereof disposed substantially coplanar with one another and closely adjacent the front face 25 of the housing. The main jaw carrier 31 has a jaw mounting structure 41 thereon, specifically a dovetail guide structure which opens downwardly. The locking wedge 38 has a similar jaw mounting structure 42 thereon, specifically an upwardly directed dovetail guide structure. These dovetail guides 41 and 42 extend substantially parallel to one another and are disposed so that they are substantially perpendicular to the radially extending centerline of the carrier assembly. The rear sloped wedge surface on each dovetail guide extends at an angle of 45° relative to the rotational axis 20 of the chuck assembly. Further, the dovetail guide 42 associated with the locking wedge is disposed radially outwardly from the guide 41 associated with the main carrier.

The locking wedge 38 is continuously urged radially upwardly relative to the main carrier 31 by a conventional compression spring 43, the latter being disposed between the locking wedge 38 and the lower end of the groove 36, such as by having the ends thereof confined within appropriate bores. Hence, the spring exerts a continuous radially outward biasing force on the locking wedge. A stop or limiting screw 44 is threadably engaged with and projects through the main carrier 31 into the groove 36. The inner end of this limiter screw 44 has a nose portion which projects into a radially elongated slot 45 formed in the side wall of the locking wedge 38. This slot 45 has shoulders at opposite ends thereof which effectively function as stop surfaces for defining the radially inner and outer limit positions of the locking wedge 38 relative to the jaw carrier 31.

The rear surface of the locking wedge 31 has a relief slot or groove 48 formed thereon, which slot projects radially outwardly from the radially inner end of the locking wedge, with this release slot 48 terminating in an inwardly directed shoulder or stop surface 49. This latter shoulder 49 is designed to cooperate with a lock assembly 51 to permit the locking wedge 38 to be fixedly locked in its outermost limit position relative to the main jaw carrier.

To accommodate and define the lock assembly 51, the main jaw carrier 31 has a bore 52 which projects radially inwardly form the outer peripheral surface thereof, this bore 52 being parallel with and spaced axially adjacent the rear surface of the T-shaped slot 22. Bore 52 has a screw-type seat or cam 53 threadably engaged with the jaw carrier 31 adjacent the lower end of the bore. This cam or seat has an upper surface which can be elevationally adjusted by rotation of the cam, and which is adapted to function as a support for the lower axial end of a rotatable locking cam 54. This locking cam is formed substantially as a cylindrical element which is closely but rotatably supported within the bore 52 so that the lower end of the cam bears against the seat member 53. Locking cam 54 has a reduced diameter stem 55 which projects axially thereof, and hence outwardly of the bore 52 so that the free end of this stem 55 is disposed closely adjacent the radially outer surface of the main jaw carrier. Stem 55 has a suitable structure, such as an opening 56, associated therewith for accommodating a conventional tool, such as an Allen wrench, to permit selective rotation of the cam 54. The stem 55 projects through an end plate 57 which closes off the outer end of bore 52 for confining the locking cam within the bore, which end plate is fixed to the jaw carrier by fasteners such as screws.

The locking cam 54 defines thereon an upper axial end surface 61 which functions as a shoulder or abutment, and which is adapted to be disposed directly under the shoulder 49 of the locking wedge to permit securement of the locking wedge in its radially outer limit position.

The locking cam 54 has a substantially cylindrical outer peripheral wall 62 of a radius such that, coupled with the positioning of the cam relative to the locking wedge, results in the cam projecting into the relief passage 48 below the shoulder 49 when fixing of the locking wedge 38 in its outer limit position is desired. To permit release of the locking wedge 38, however, the locking cam 54 has a peripheral wall portion thereof removed so as to form a flat 63. Hence, when the locking cam is rotated so that this flat 63 is disposed in opposed facing (i.e. parallel) relationship to the axially rear surface of the locking wedge 38, then the locking cam 54 no longer projects under the shoulder 49 and hence the locking wedge can be manually displaced radially inwardly of the groove 36.

Top jaw 13 is provided with structure thereon which compatibly cooperates with the jaw carrier assembly 12. For this purpose, the top jaw 13 has opposed lower and upper mounting structures 65 and 66 which are formed as dovetail guides, and these are designed to respectively engage the dovetail guides 41 and 42 so that the rear face 67 of the top jaw will hence be drawn snugly against the front face 68 as defined on the jaw carrier assembly. The top jaw 13 also has, adjacent the upper and lower ends thereof in the vicinity of the dovetail guides 65 and 66, pairs of rearwardly projecting legs 69 which project outwardly beyond the dovetail guides and effectively snugly straddle the opposite sides of the jaw carrier when the top jaw is mounted thereon.

OPERATION

To mount a top jaw 13 on a jaw carrier assembly 12, an appropriate wrench is inserted into the opening 56 of stem 55, whereby locking cam 54 is rotated through about one-third of a revolution, whereby this effects withdrawal of the locking cam 54 from beneath the shoulder 49 by causing the flat 63 to be disposed in opposed facing relationship to the rear of the locking wedge 38. The locking wedge will still remain in its radially outer limit position due to the urging of the spring 43. The operator then applies finger pressure against the radially outer surface 71 of the locking wedge so as to slidably radially displace the locking wedge 38 inwardly against the urging of spring 43. This causes the dovetail guide 42 to be moved inwardly toward the guide 41 and reduces the spacing therebetween so that it is less than the dimension or mouth opening between the guides 65 and 66 on the top jaw 13.

The radially inward movement of the locking wedge 38 is limited by the engagement of the limiter screw 44 with the upper end of the slot 45. While manually maintaining the locking wedge 38 in its radially inner position, the operator then moves the top jaw 13 axially toward the front face of the chuck assembly so that the side legs 69 effectively straddle the jaw carrier 31, and the dovetail guides 41 and 42 project into the mouth of the top jaw as defined between the guides 65 and 66. This movement of the top jaw by the operator hence occurs straight toward the chuck assembly and substantially parallel with the rotational axis 20. The operator then relieves the finger pressure on the locking wedge 38 so that spring 43 urges the locking wedge radially outwardly, whereupon the dovetail guide 42 engages the upper dovetail guide 66 on the top jaw, and continual radial outward movement of the locking wedge due to the urging of spring 43 results in the top jaw 13 being properly engaged with the guides 41 and 42. Thereafter the operator manually rotates the locking cam 54 in the reverse direction back to its original position which hence results in the upper shoulder 61 on the locking cam moving into a position directly beneath the shoulder 49 on the locking wedge so as to prevent radial inward movement of the latter. This hence results in the locking wedge being fixedly secured in its radially outermost position, and hence positively maintains the top jaw securely mounted on the carrier assembly 12 due to the interfitting relationship of the dovetail guides 65 and 66 on the cooperating guides 41 and 42.

During operation of the chuck assembly, the effect of centrifugal force as caused by rotation of the chuck assembly is such as to tend to urge the locking wedge 38 radially outwardly, and hence this further assists in maintaining a secure holding of the top jaw 13 due to the manner in which the top jaw is confined by the dovetail guides 41 and 42.

While the shoulder or end surface 61 formed on the locking cam 54 is normally flat, nevertheless this end surface 61 can be provided with a slight slope or ramp thereon, such as resembling a spiral ramp, if such is deemed necessary or desirable in order to wholly eliminate any clearance between the surfaces 49 and 61 when the locking cam is in its locked position.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a chuck construction having a housing rotatable about an axis, and a plurality of jaw carrier assemblies mounted on the housing for movement radially thereof, each jaw carrier assembly being adapted to have a top jaw mounted thereon adjacent the front face of the housing, the improvement comprising:
   means associated with each said jaw carrier assembly for permitting secure mounting and quick changing of the top jaw, said means including a main jaw carrier slidably mounted on said housing for movement relative thereto in a first direction which includes a radial component of movement, said main jaw carrier having a first guide structure for engagement with the top jaw, a locking wedge slidably supported on said main jaw carrier for slidable movement relative thereto along a second direction which is substantially parallel to said first direction, said locking wedge being movable relative to the main jaw carrier between a top jaw holding position and a top jaw release position, said positions being radially spaced apart, said locking wedge having a second guide structure for engagement with the top jaw, said first and second guide structures being disposed in radially spaced relationship and being disposed at least partially in radially opposite directions for effecting radial holding of the top jaw therebetween, and spring means for normally biasing the locking wedge radially relative to said main jaw carrier toward said holding position.

2. A chuck construction according to claim 1, including locking means movably mounted on said main jaw carrier and engageable with said locking wedge solely when the latter is in said holding position to prevent movement of said locking wedge away from said holding position.

3. A chuck construction according to claim 2, wherein said first and second guide structures define wedges which are inclined relative to the rotational axis in opposite directions and which cooperate with an interfitting inclined wedge arrangement provided on the top jaw.

4. A chuck construction according to claim 2, wherein each of said first and second guide structures defines a dovetail guide having a wedging surface which defines a plane which intersects the rotational axis at an angle of about 45°, the plane as defined by the wedging surfaces of said first and second guides being inclined in opposite directions so that the planes substantially perpendicularly intersect one another, and said top jaw having first and second wedgelike guides which respectively matingly engage the first and second guide structures.

5. A chuck construction according to claim 2, wherein said housing includes a slot which opens radially outwardly through the annular peripheral surface thereof, said slot having a centerline which projects radially and in perpendicular intersecting relationship to the rotational axis, said slot also opening axially through the front face of the housing, said main jaw carrier being confined within said slot for radial displacement therealong, said main jaw carrier having a groove formed radially thereof and opening outwardly through the front face of the housing, said locking wedge being confined within and axially slidably movable along said groove, said second guide structure being disposed radially outwardly from said first guide structure, said spring means coacting between said locking wedge and said main jaw carrier for normally urging said locking wedge radially outwardly into said holding position, said locking wedge being movable radially inwardly away from said holding position toward said release position, said locking wedge having a radially-inwardly directed shoulder formed thereon, and said locking means including a locking member rotatably movable into a locking position wherein it projects radially under said shoulder when said locking wedge is in said holding position.

6. A chuck construction according to claim 5, wherein said locking member is supported for rotational movement on said main jaw carrier about an axis which extends substantially parallel with the centerline of said slot, said locking member being disposed within a bore with projects radially inwardly from the radially outer surface of said main jaw carrier so as to be accessible therefrom, said locking member being rotatable between locking and unlocking positions which are spaced less than 360° apart.

7. A chuck construction according to claim 6, wherein said locking member is rotatable into said locking position only when said locking wedge is in said holding position, and stop means coacting between said main jaw carrier and said locking wedge for normally maintaining said locking wedge in said holding position due to the urging of said spring means.

8. A chuck construction according to claim 1, wherein said housing includes a slot which opens radially outwardly through the annular peripheral surface of the housing, said slot having a centerline which projects radially and in perpendicular intersecting relationship to the rotational axis, said slot also opening axially through the front face of the housing, said main jaw carrier being confined within said slot for radial displacement therealong, said main jaw carrier having a groove formed radially thereof and opening outwardly through the front face of the housing, said locking wedge being confined within and axially slidably movable along said groove, said second guide structure being disposed radially outwardly from said first guide structure, said spring means coacting between said locking wedge and said main jaw carrier for normally urging said locking wedge radially outwardly into said holding position, said locking wedge being movable radially inwardly away from said holding position toward said release position.

9. A chuck construction, comprising:
an annular housing rotatable about its axis, said housing having a central bore and a plurality of slots which open radially outwardly from said central bore through an outer annular peripheral surface of the housing, said slots also opening axially through a front axial face of the housing, said slots being angularly spaced apart around said housing;
a jaw carrier assembly confined within and slidably supported for radial displacement along a respective one of said slots, said jaw carrier assembly including a main jaw carrier which is radially slidably supported within the respective slot, said main jaw carrier having a front portion thereof which projects axially forwardly beyond the front face of the housing, said main jaw carrier having an actuator portion formed on the radially inner end thereof;
an actuator assembly axially slidably supported within the bore of said housing and interconnected to the actuator portion of said main jaw carrier for causing radial displacement of the jaw carrier in response to axial displacement of the actuator assembly;
said jaw carrier assembly including an auxiliary jaw carrier supported on said main jaw carrier for slidable displacement radially of said slot with respect to said main jaw carrier, said auxiliary jaw carrier having a front portion which projects axially outwardly beyond the front face of said housing;
means for engaging a top jaw including a first jaw-engaging wedge provided on the front portion of said auxiliary jaw carrier for engagement with a top jaw, and a second jaw-engaging wedge provided on the front portion of said main jaw carrier for locking engagement with a top jaw, said first and second jaw-engaging wedges being disposed in substantially parallel and radially spaced relationship from one another so that the jaw-engaging wedges are elongated in directions which extend substantially perpendicular to the radial direction of said slot.

10. A chuck construction according to claim 9, wherein said main jaw carrier has a radially elongated passage formed therein and opening axially through the front face thereof, and said auxiliary jaw carrier being radially slidably supported on and confined within said passage so as to be directly supported on said main jaw carrier.

11. A chuck construction according to claim 9, wherein said first jaw-engaging wedge is spaced radially outwardly from said second jaw-engaging wedge, and spring means coacting between said main and auxiliary jaw carriers for normally urging said auxiliary jaw carrier radially outwardly into a jaw-holding position as defined by a stop.

12. A chuck construction according to claim 11, including safety locking means movably coacting between said main and auxiliary jaw carriers for fixedly locking said auxiliary jaw carrier in said jaw-holding position.

13. A chuck construction according to claim 12, wherein said locking means includes a manually-movable locking member movably supported on one of said jaw carriers and having a part thereof which moves into radially overlapping relationship with a shoulder formed on the other jaw carrier for preventing relative radial displacement between the main and auxiliary jaw carriers when the locking member is in its locking position.

14. A chuck construction according to claim 11, wherein said main and auxiliary jaw carrier have means cooperating therebetween for permitting confined slidable displacement of said auxiliary jaw carrier relative to said main jaw carrier radially of said slot between radially inner and outer limit positions.

15. A chuck construction according to claim 1, wherein said second guide structure is disposed radially outwardly with respect to said first guide structure, and wherein said spring means normally biases said locking wedge in a radially outward direction toward said holding position, said holding position being disposed radially outwardly with respect to said release position.

16. In a chuck construction having a housing rotatable about an axis, and a plurality of jaw carrier assemblies movably mounted on the housing for movement radially thereof, each jaw carrier assembly being adapted to have a top jaw mounted thereon adjacent the front face of the housing, the improvement comprising:

means associated with each said jaw carrier assembly for permitting secure mounting and quick changing of the top jaw, said means including a main jaw carrier slidably mounted on said housing for movement relative thereto in a first direction which includes a radial component of movement, said main jaw carrier having a first guide structure for engagement with the top jaw, an auxiliary jaw carrier slidably supported relative to said housing and relative to said main jaw carrier for slidable movement along a second direction which is substantially parallel to said first direction, said auxiliary jaw carrier being movable between top jaw holding and release positions which are radially spaced apart along said second direction, said auxiliary jaw carrier having a second guide structure for engagement with the top jaw, said first and second guide structures being disposed in radially spaced relationship and being disposed at least partially in radially opposite directions for effecting radial holding of the top jaw therebetween, spring means for normally biasing the auxiliary jaw carrier radially toward said holding position, and locking means movably mounted on one of the jaw carriers of said jaw carrier assembly and lockingly engageable with the other jaw carrier of the same jaw carrier assembly when the auxiliary jaw carrier is in said holding position to prevent movement of said auxiliary jaw carrier away from said holding position.

* * * * *